United States Patent
Clement et al.

(10) Patent No.: US 8,366,192 B2
(45) Date of Patent: Feb. 5, 2013

(54) COUPLING DEVICE FOR SECURING A CHILD CAR SEAT TO A VEHICLE

(75) Inventors: David Clement, Colorado Springs, CO (US); Russell Berger, Needham, MA (US)

(73) Assignee: SKJP Holdings, LLC, Naples, FL (US)

( * ) Notice: Subject to any disclaimer, the term of this patent is extended or adjusted under 35 U.S.C. 154(b) by 59 days.

(21) Appl. No.: 13/052,648

(22) Filed: Mar. 21, 2011

(65) Prior Publication Data

US 2011/0233374 A1    Sep. 29, 2011

Related U.S. Application Data

(60) Provisional application No. 61/316,955, filed on Mar. 24, 2010.

(51) Int. Cl.
*A47C 1/08* (2006.01)
(52) U.S. Cl. ............. 297/253; 248/503.1; 248/542; 297/217.2; 297/256.16
(58) Field of Classification Search ............. 248/542, 248/544, 503.1; 297/253, 256.16, 217.2
See application file for complete search history.

(56) References Cited

U.S. PATENT DOCUMENTS

| | | | |
|---|---|---|---|
| 4,480,870 A | 11/1984 | von Wimmersperg | |
| 5,551,751 A | 9/1996 | Sedlack et al. | |
| 5,722,719 A | 3/1998 | Glomstad | |
| 6,183,044 B1 | 2/2001 | Koyanagi et al. | |
| 6,454,350 B1 | 9/2002 | Celestina-Krevh et al. | |
| 6,767,057 B2 | 7/2004 | Neelis | |
| 6,817,665 B2 | 11/2004 | Pacella et al. | |
| 6,871,908 B2 | 3/2005 | Takizawa | |
| 7,270,373 B2 | 9/2007 | Sakumoto | |
| 7,328,946 B2 * | 2/2008 | Hendrikus Van Montfort et al. | 297/253 |
| 7,467,825 B2 * | 12/2008 | Jane Santamaria | 297/253 |
| 7,488,034 B2 | 2/2009 | Ohren et al. | |
| 2002/0074840 A1 | 6/2002 | Nakagawa et al. | |
| 2006/0170262 A1 | 8/2006 | Gold et al. | |
| 2007/0069562 A1 | 3/2007 | Van Montfort et al. | |
| 2008/0315647 A1 | 12/2008 | Carine | |

(Continued)

FOREIGN PATENT DOCUMENTS

| | | |
|---|---|---|
| DE | 29817365 U1 | 2/1992 |
| DE | 20213665 U1 | 11/2002 |

(Continued)

OTHER PUBLICATIONS

Instructions for Baby-Safe ISOFIX Base.

(Continued)

*Primary Examiner* — Ramon Ramirez
(74) *Attorney, Agent, or Firm* — Barlow, Josephs & Holmes, Ltd.

(57) ABSTRACT

A device for locking to a vehicle seat having a child car seat mounting system includes a pair of pawl assemblies with hooks that connect to the loops of a child car seat mounting system. The hooks are spring-actuated pawls. The device includes two indicator windows that can respectively display the open or locked status of the first hook and the second hook, which move in unison and also lock and open in unison. The indicator windows separately confirms the condition of both of the hooks. A button is interconnected to both of the hooks to simultaneously control opening and locking thereof. The button is also interconnected to a ratchet to permit simultaneous relocation of the hooks for custom adjustment. A child car seat can be mounted to the device to secure the child seat to a vehicle seat that includes a child car seat mounting system.

9 Claims, 19 Drawing Sheets

U.S. PATENT DOCUMENTS

| | | | |
|---|---|---|---|
| 2009/0026815 A1 | 1/2009 | Amesar et al. | |
| 2009/0102253 A1 | 4/2009 | Forbes et al. | |
| 2009/0256404 A1 | 10/2009 | Strong et al. | |
| 2009/0261640 A1* | 10/2009 | Christ et al. | 297/253 |
| 2009/0273215 A1* | 11/2009 | Barker et al. | 297/253 |
| 2009/0302647 A1 | 12/2009 | Przybylo et al. | |
| 2010/0032997 A1 | 2/2010 | Gold et al. | |
| 2010/0060046 A1 | 3/2010 | Vertegaal | |

FOREIGN PATENT DOCUMENTS

| | | |
|---|---|---|
| DE | 10351753 A1 | 6/2005 |
| DE | 102004022316 A1 | 11/2005 |
| DE | 102005007262 A1 | 8/2006 |
| DE | 202007012746 U1 | 12/2007 |
| EP | 1757484 A2 | 2/2007 |
| EP | 1849649 A1 | 10/2007 |
| FR | 2866844 A1 | 9/2005 |
| FR | 2870498 A1 | 11/2005 |
| GB | 2425463 A | 11/2006 |

OTHER PUBLICATIONS

Instructions for ISOFIX-Adapter.
Instructions for use MAXI-COSI Car Seats.

* cited by examiner

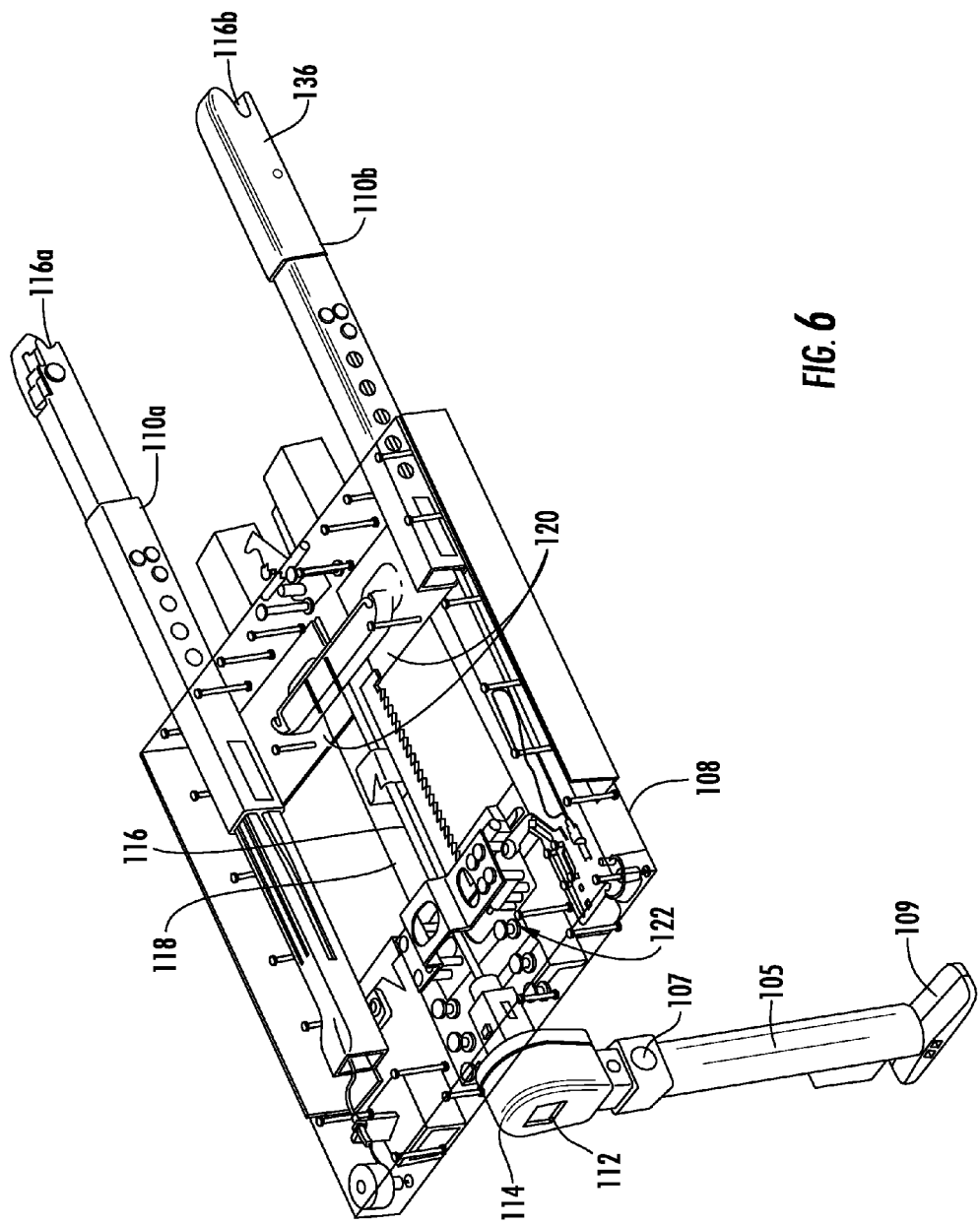

COUPLING DEVICE FOR SECURING A CHILD CAR SEAT TO A VEHICLE

CROSS-REFERENCE TO RELATED APPLICATIONS

This application is related to and claims priority from earlier filed provisional patent application Ser. No. 61/316,955, filed Mar. 24, 2010, the entire contents thereof is incorporated herein by reference

BACKGROUND OF THE INVENTION

The present invention relates generally to child restraint and safety devices. More specifically, the present invention relates to child restraint and safety (CRS) devices, such as child car seats and booster seats.

In the prior art, child safety restraints, such as those for use in a vehicle are very well known in the art. Such restraints are secured to an existing vehicle car seat. The child is then secured to the restraint to secure the child during travel. These prior art restraints are typically in the form of a booster seat or a child car seat. A booster seat is commonly known as a seat that attached to an existing vehicle seat where the seat uses the existing belt restraint system of the vehicle. Such a booster seat is commonly used for older children. Also, a child restraint may be in the form of a child car seat, which is secured itself directly to the vehicle, such as by the car's seat belt system or directly to the frame of the vehicle using hooks, and other attachment mechanisms and systems.

Many countries around the world have standardized how a child car seat is to be secured to a vehicle seat and how movement of the seat is controlled in the event of an impact to improve the overall safety of children's car seats in vehicles.

Turning first to interconnection of the child restraint seat to a vehicle seat, a system called Lower Anchors and Tethers for Children (LATCH) is commonly used, which includes two lower anchor attachments and a top tether. The term is often used generically to refer only to the pair of fixed lower loop shaped anchors built into the bight or crack between the seat back and seat cushion. Prior Art FIG. 1 shows such a lower loop, typically made of metal, which are specifically designed for children's car seat installation. When used, existing seatbelts are no longer necessary to install the car seat because the child car seat is mounted directly to the vehicle via the metal loops using webbing or a "rigid" connector. This makes it easier to install car seats safely, and to make it more universal among car seats and vehicles. Compatible corresponding LATCH coupling systems are now commonly found on child car seat bases, rear-facing, front-facing and combination booster seats and those that have an internal harness.

The LATCH system was originally called ISOFIX, which is a term still used in Europe. Canada employs a similar standard called the Universal Anchorage System (UAS). It has also been called the Universal Child Safety Seat System or UCSSS. All of foregoing systems refer to the same universal anchorages that started to appear on car models starting in about the year 2000. These are now required by law in the United States for almost all model year 2003 and later vehicles.

As seen in FIG. 2, a child car seat is secured directly to the loop of a LATCH system by use of webbing included with the child car seat. The webbing is routed through the loop of the LATCH system and then tensioned to tightly tether the child car seat to the vehicle car seat. One or more LATCH loops can be used to respectively tether one or more points of the child car seat in place. Looped tensioned webbing through a LATCH loop is undesirable because it must be threaded through the LATCH loop. As an alternative, rigid interconnects can be used.

More preferably, a coupling is employed to releasably interconnect the free webbing attached to the child car seat to the LATCH loop(s). This facilitates and speeds up the installation of a child car seat to the LATCH loops. FIGS. 3 and 4 illustrate a lower anchor coupling that is known in the art for this purpose. As can be seen in FIG. 3, the coupling including a closed loop to receive the webbing that is attached to the child car seat. Details of such webbing and the tensioning thereof need not be discussed in further detail herein because they are so well known in the art. As seen in FIG. 4, a locking pawl in the open side can be disengaged by actuation of the button. The locking pawl is spring-biased to a closed position. Preferably, the open side of the coupling, with webbing attached to the opposite side thereof, is pressed over the LATCH loop to temporarily open the pawl so that the LATCH loop is captured by the pawl. To release the LATCH loop from the locking pawl, the button is actuated so the coupling can be disconnect to free the child car seat from the LATCH system of the car.

The primary problem associated with the prior art coupling of FIGS. 3 and 4 is that it is not designed for these increased loads. The actual internal operating mechanism itself is not robust enough to take the loads of a higher weight occupant in a child car seat. Also, the design of this prior art coupling suffers from an off-center webbing connector loop which results in uneven/asymmetrical loads to the coupling, which reduces the structural integrity of the coupling and the entire child car seat installation. Also, the location and direction of travel of the release button of this prior art coupling is cumbersome and difficult to use. The locking pawl of this prior art device is only a single piece of steel, resulting in a relatively small bearing and support area. This limits the overall strength and integrity of the coupling. In summary, the prior art lower anchor coupling of FIGS. 3 and 4 is inadequate for securing child car seats with large loads, such as child car seats with larger children seated therein.

While the prior art lower anchor coupling is useful in many respects, it suffers from many disadvantages. For example, it is difficult to interconnect a seat to the LATCH/ISOFIX system of a vehicle and to match of the two connectors that affix to the fixed metal loops of the system. There are problems in the prior art in that it is not always clear to the installer whether the child restraint seat is successfully secured to the vehicle's LATCH/ISOFIX system.

Therefore, there is a need for a coupling system that can interface better with the child seat itself to provide more control over the interconnection of the child car seat to the vehicle seat and LATCH system. There is a desire for a child car seat to more easily connect to a vehicle's LATCH system. There is a need to be able to determine whether the child car seat has been successfully interconnected to the vehicle's LATCH system. There is a need for a system that enables the locking connectors to slide in an out in tandem to further facilitate interconnection of a child car seat to a vehicle's LATCH system. There are further needs for a LATCH coupling that is easy to use, namely, one that is easy to install and disconnect.

SUMMARY OF THE INVENTION

The present invention preserves the advantages of prior art child restraint devices, such as child seats and booster seats and couplings therefor. In addition, it provides new advantages not found in currently available devices and overcomes many disadvantages of such currently available devices.

The present invention provides a device for locking to a vehicle seat having a child car seat mounting system includes a pair of pawl assemblies with hooks that connects to the loops of a child car seat mounting system. The hooks are spring-actuated pawls. The device includes two indicator windows that can respectively display the open or locked status of the first hook and the second hook, which move in unison and also lock and open in unison. The indicator windows separately confirms the condition of both of the hooks. A button is interconnected to both of the hooks to simultaneously control opening and locking thereof. The button is also interconnected to a ratchet to permit simultaneous relocation of the hooks for custom adjustment. A child car seat can be mounted to the device to secure the child seat to a vehicle seat that includes a child car seat mounting system.

Therefore, an object of the present invention is to provide a new and unique coupling system that can better interconnect a child seat to a vehicle seat and the LATCH system therein.

A further object of the present invention is to simplify the engagement of a child car seat to a vehicle's LATCH system.

Another object of the present invention is to enable a pair of locking pawls, that engage with the loop of a LATCH system to be controlled by a single button.

Another object is to provide two indicator members to respectively display the locked or open status of both of the two locking pawls.

An object of the present invention is to enable a single button to simultaneously control the locking and opening of the pair of locking pawls, permit relocation of the locking pawls for custom fit to the vehicle's LATCH system while also displaying the current respective status of both of the locking pawls.

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 6 is a perspective partial fragmentary view of the coupling device of the present invention;

FIG. 11 is a side view of the locking pawl with release plate removed for illustration purposes.

DETAILED DESCRIPTION OF THE PREFERRED EMBODIMENT

Figure 1:
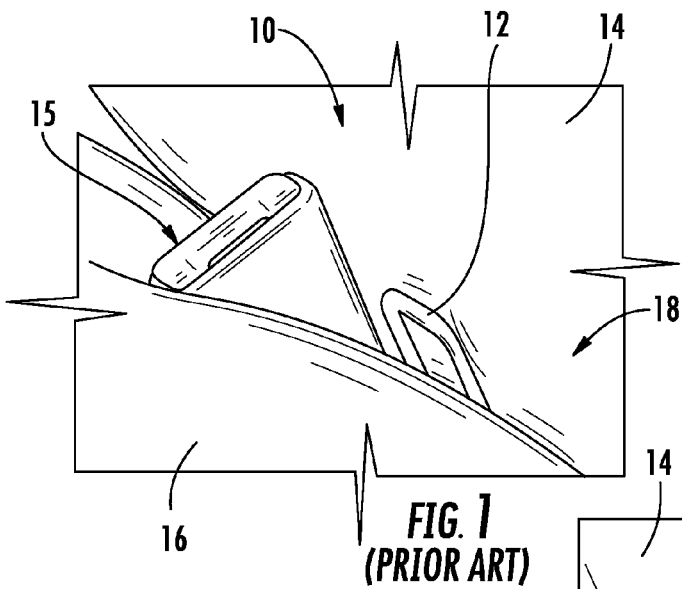
FIG. 1 is a perspective view of a prior art LATCH system for interconnection of child car seat thereto.
Figure 2:
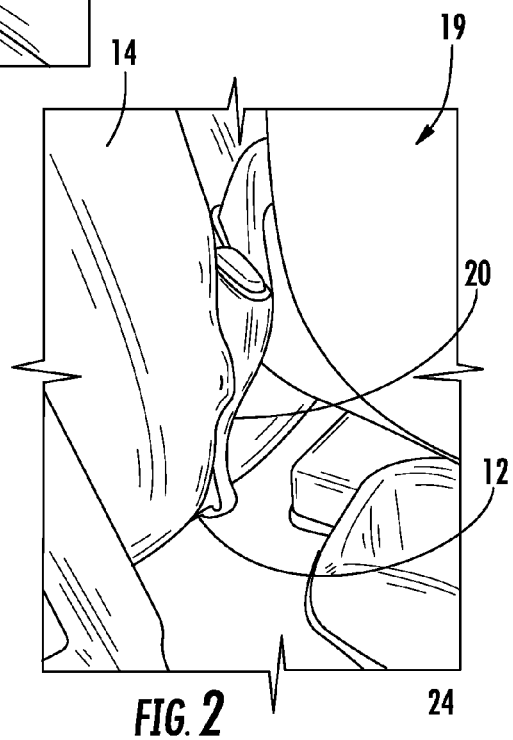
FIG. 2 is a perspective view of an interconnection of a child car seat to a LATCH system using a prior art direct tether connection.
Figure 3:
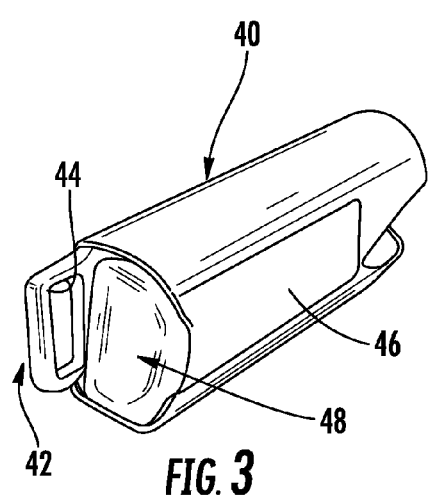
FIG. 3 is a front perspective view of a prior art lower anchor coupling.
Figure 4:
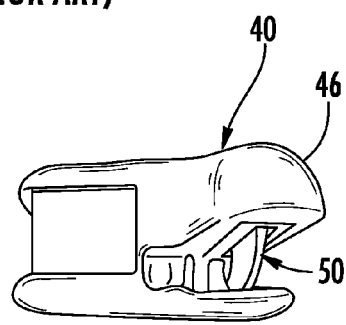
FIG. 4 is a rear perspective view of the prior art lower anchor coupling of FIG. 3.
Figure 5A:
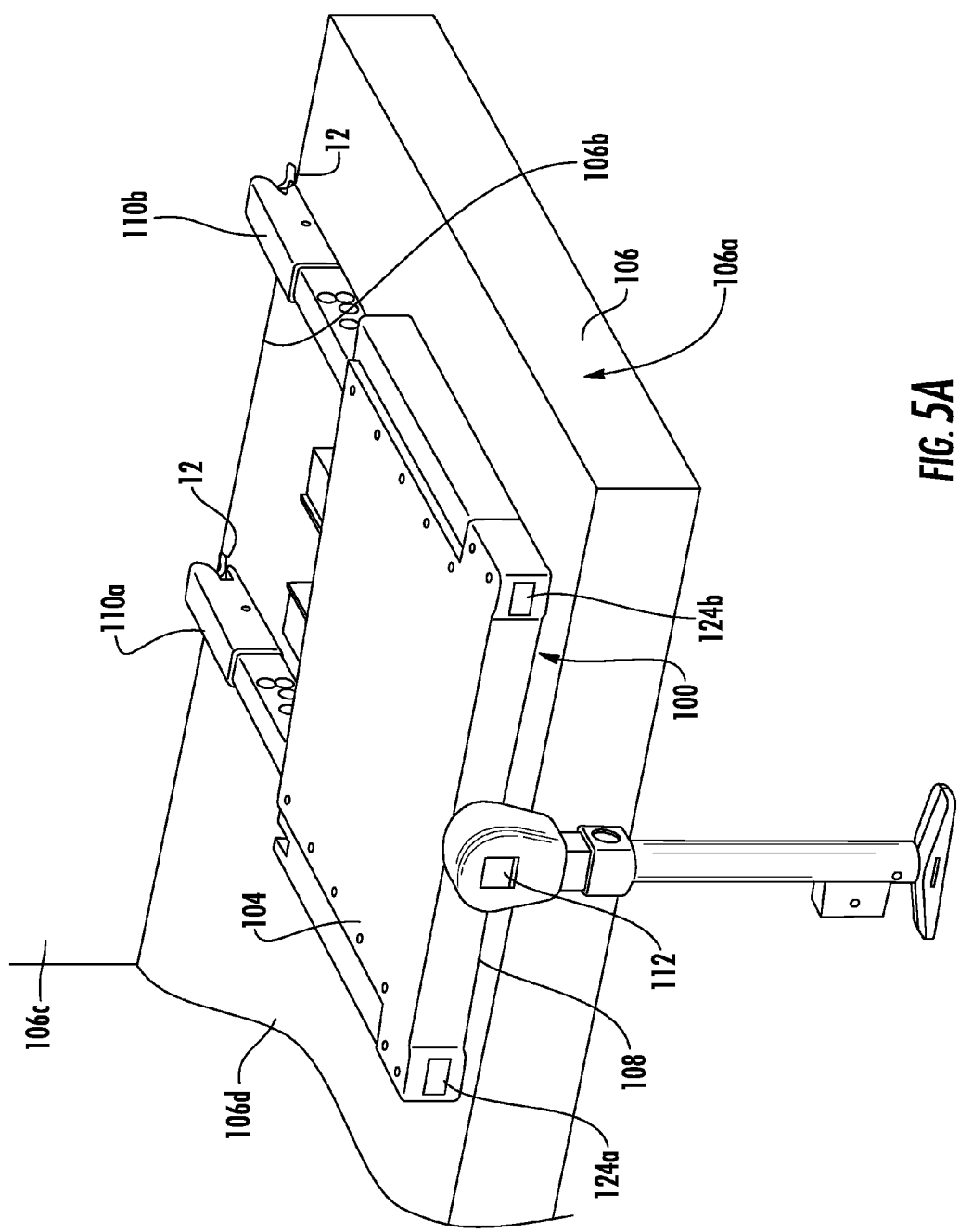
FIG. 5 is a perspective view of the coupling device of the present invention.
Figure 5B:
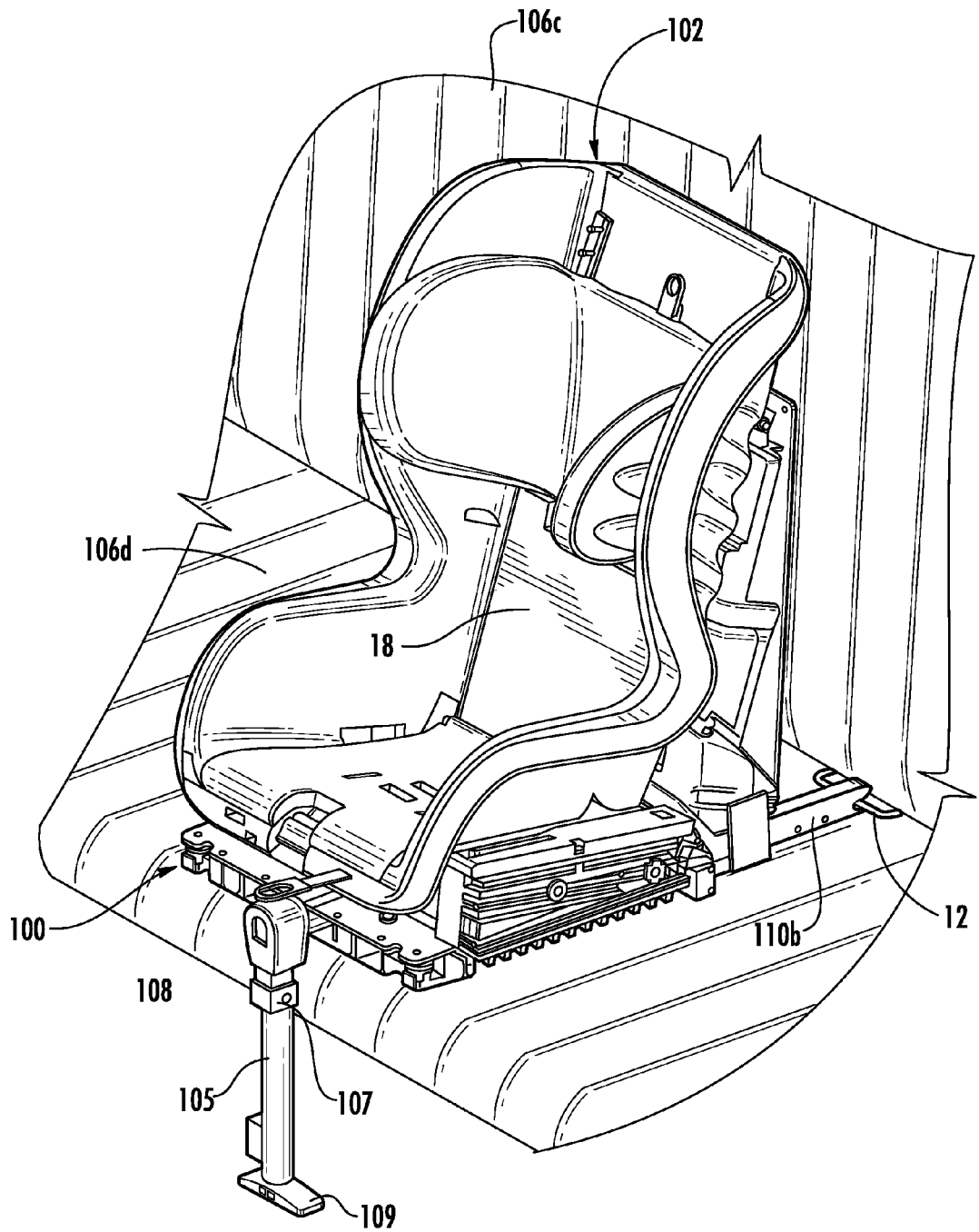

Turning first to FIG. 5A, the coupling device 100 and system of the present invention is shown. As in FIG. 5B, a child car seat 102 can be bolted on or otherwise by secured to the support surface 104 of the coupling device so that a vehicle seat 106 ultimately may be secured to the LATCH system 12 of the vehicle. Alternatively, the child car seat 102 may be integrated into the coupling device 100 of the present invention. FIG. 5B illustrates such and interconnection of a child car seat 102 to the coupling device 100 of the present invention. As can be seen, the coupling device 100 provides a support for the child car seat 102 to help protect the surface 106*a* of the vehicle seat 106 and also provide a more secure connection of the child car seat 102 to the vehicle via its LATCH system 12.

More specifically, the coupling device 100 includes a housing 108 with a support surface 104 thereon for supporting a child car seat 102 as can be seen in FIG. 5B. Emanating from the rear of the housing 108 are a pair of locking pawl assemblies, generally referred to as 110*a* and 110*b*. These locking pawl assemblies 110*a* and 110*b* releasably engage with the loops 12 of a vehicles LATCH system located at the bight 106 between the vehicle seat back 106*c* and the vehicle seat bottom 106*d*, as can best be seen in FIG. 5A. On the front of the housing 108 is a button 112 that controls the entire operation of the device 100.

Figure 7:
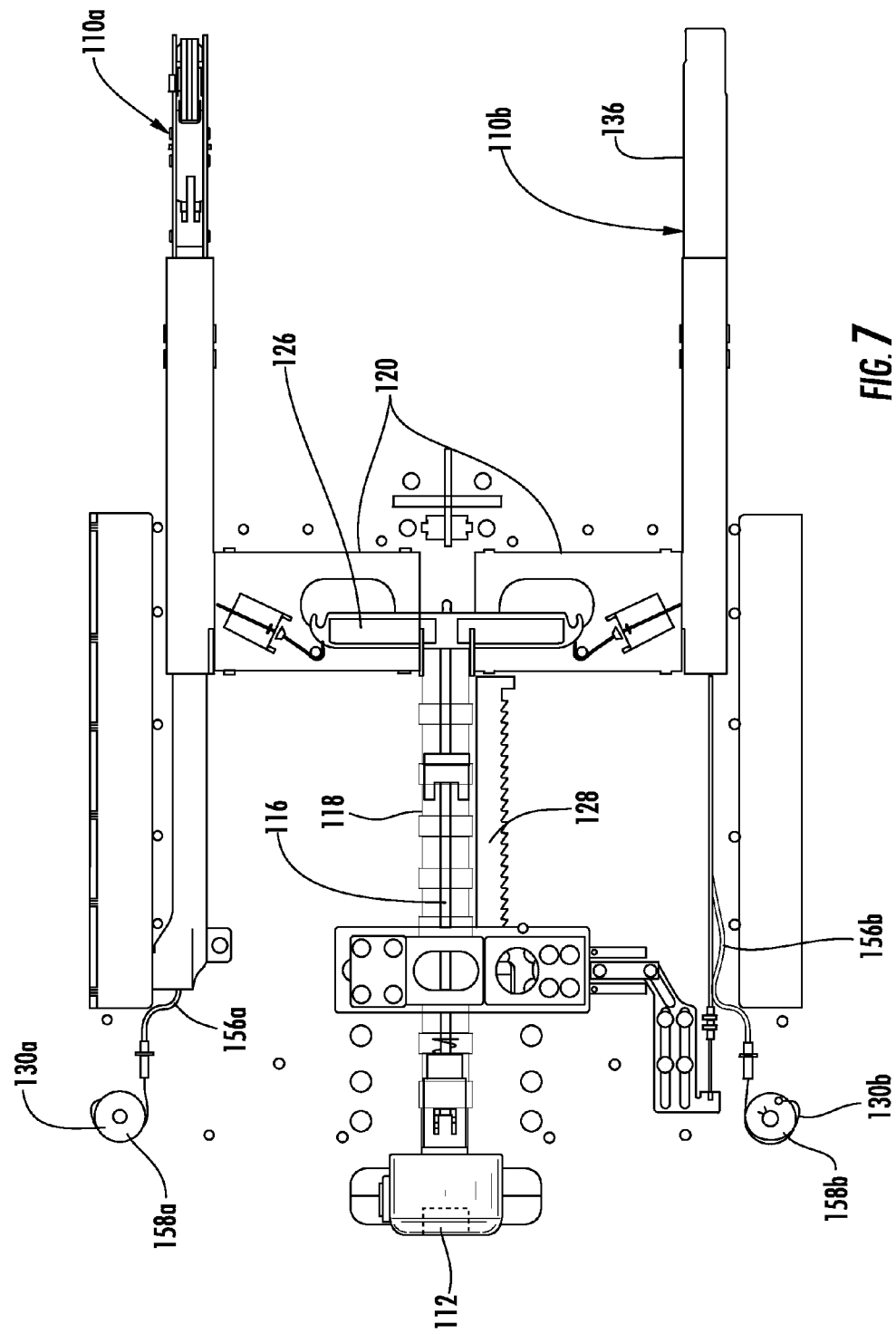
FIG. 7 is a top view of the coupling device of the present invention with housing removed for illustration purposes.

As will be described in detail below, the button 112 resides within a button housing 114 is connected to a pawl release pin 116, as best seen in FIGS. 6 and 7. Pin 116 is routed through primary shaft 118. The button housing 114 is connected to a hollow primary shaft 118 that is connected to a cross-plate 120, make up of one or more plates connected together, that interconnects the two pawl assemblies together 110*a* and 110*b* so that they may travel in unison. Thus, when the primary shaft 118 is actuated in an out, the two pawl assemblies 110*a* and 110*b* travel accordingly. The button 112 releases a ratchet assembly, generally referred to as 112 and best seen in FIGS. 14 and 15, to enable this relocation of the two pawl assemblies 110*a* and 110*b* and, therefore, the locking teeth 116*a* and 116*b* on the free ends thereof. This enables custom and tight installation of the device, with child seat 102 thereof, against a vehicle car seat 106 using its LATCH system 12. Still further the button 112 simultaneously opens the locking pawl assemblies 110*a* and 110*b* to enable them to engage with the loops 12 of the vehicles LATCH system. On the front face, for easy view by the user, a pair of windows 124*a* and 124*b* are provided that display the current status of the two locking pawl assemblies 110a and 110b, namely, whether they are open or locked. Such dual windows 124a and 124b enables the status of both locking pawl assemblies 110a and 110b to be confirmed by user before use of the device 100.

FIG. 6 shows a partial fragmentary view of the coupling device 100 of FIG. 5 where the housing 108 and other surfaces are partially removed to reveal the component parts therein. FIG. 7 is a top plan view with even further components removed to leave remaining the components that are essential to operation of the present invention. In FIGS. 6 and 7, the housing 108 includes a tray-like structure. Residing therein is a generally Y-shaped construction that includes a primary shaft 118 that includes an actuation button 112, a cross-plate 120 that interconnects to two pawl assemblies 110a and 110b. As the primary shaft 118 moves in and out, the pawl assemblies 110a and 110b will also travel in and out.

Routed through the primary shaft 118 is a pawl release pin 116 that is connected to the button 112 on one end and to a cable tension plate 126 on the opposing end to control opening and locking of the pawl assemblies 110a and 110b, as will be described below in connection with FIGS. 8-11.

A ratchet arm 128 of the ratchet assembly 122 is also fixed to the primary shaft 118 so that it actuates with the primary shaft 118 when it is moved in and out. The ratchet assembly 122 is discussed in further detail in connection with FIGS. 14 and 15.

Still referring to FIGS. 6 and 7, a pair of indicator members 130a and 130b are provided that display the current status of the pawl assemblies 110a and 110b, namely, whether they are open or locked. It is very important to confirm that a child car seat 102 is successfully locked into a vehicle's LATCH system 12. Prior art systems typically lock with individual pawl assemblies on each of the two connection points for the system. The present invention uniquely provides a LATCH coupling system that uses only a single button 112 for release and locking of two pawl assemblies 110a and 110b while also providing a way to individually and separately confirm whether both of the pawl assemblies 110a and 110b have been successfully locked to the vehicle's LATCH system 12. In the present invention, these indicator members 130a and 130b are prominently displayed on the front of the coupling device 100 so they can be easily seen by the person installing a child car seat 102 to a vehicle seat 106. It is envisioned that the indictor members 130a and 130b, through windows 124a and 124b, respectively, show a display of the color red when a pawl assembly 110a and/or 110b is locked while showing a display of the color green when a pawl assembly 110a and/or 110b is open. Therefore, if both of the indicator members 130a and 130b are showing the color red, it can be understood that both of the pawl assemblies 110a and 110b are locked and the child car seat 102 is ready for safe use. Further details of the indicator members 130a and 130b for displaying the status of the pawl assemblies 110a and 110b will be discussed in detail in connection with FIGS. 12 and 13.

Figure 8:
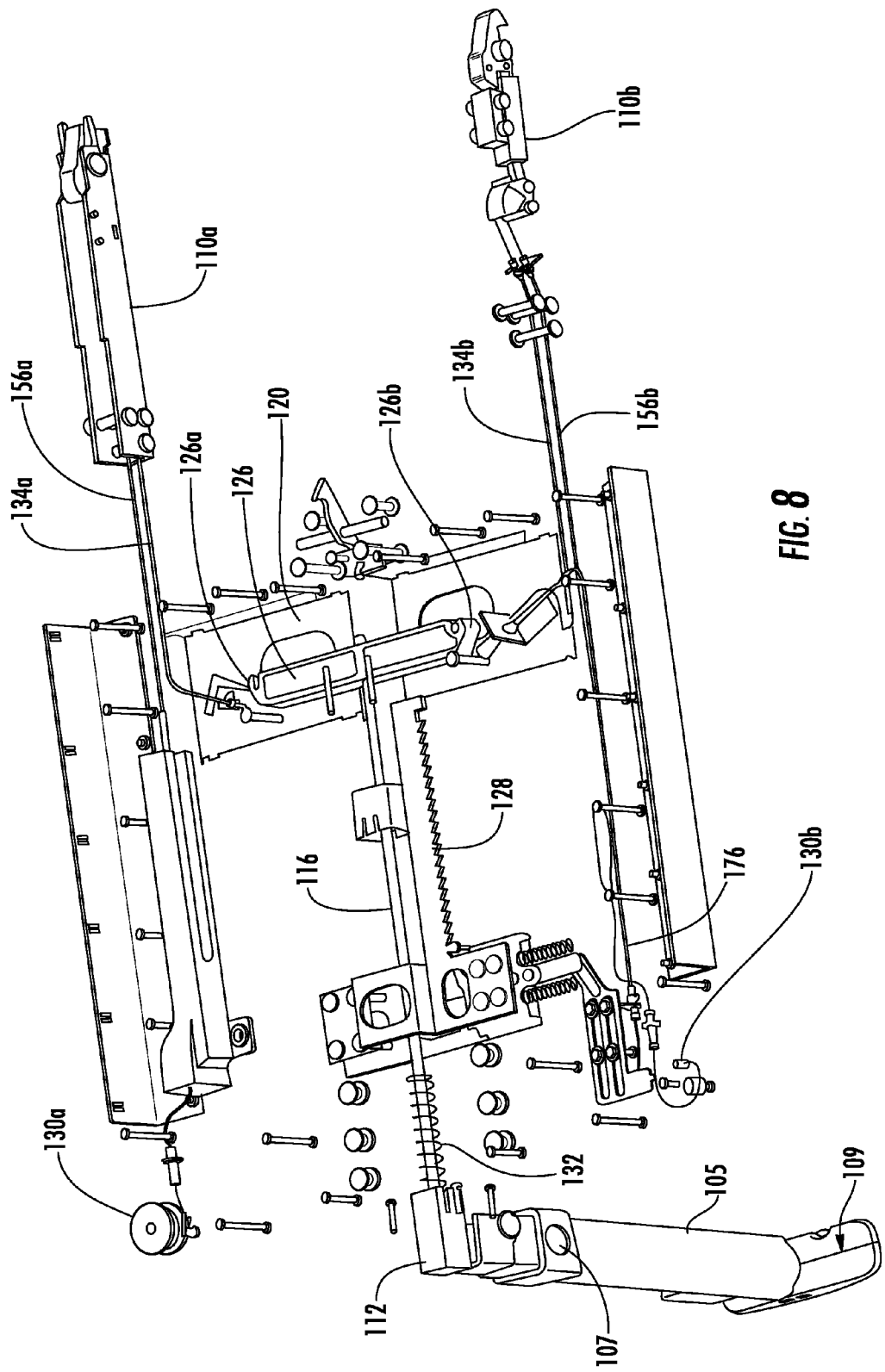
FIG. 8 is a perspective partial fragmentary view of the coupling device of the present invention with housing about the locking pawls removed for illustration purposes.

Turning now to FIGS. 8-12, details of the operation of the pawl assemblies 110a and 110b, namely the opening and locking thereof is shown. The coupling device 100 of the present employs pawl cables 134a and 134b for opening and locking the pawl assemblies 110a and 110b so they may receive the loops 12 of the vehicle's LATCH system. As can be seen in FIG. 8, the button 112 is connected to a pawl release pin 116 that is connected to a tension plate 126. The pawl release pin 116 and the tension plate 126 are spring-biased to the left relative to the cross-plate 120 that carries the pawl assemblies 110a and 110b by a coil spring 132. The tension plate 126 includes a pair of hook members 126a and 126b that receive the respective free ends of two cables 134a and 134b that are routed to the pawl assemblies 110a and 110b. The cables 134a and 134b preferably have a crimped ball on the their free ends to respectively engage with the hook members 126a and 126b. However, the cables 134a and 134b may be connected in other fashions.

Essentially, the ends of the cables 134a and 134b are fixed to the free ends 126a and 126b of the tension plate 126 so when the tension plate 126 actuates in and out via the button 112 and pawl release pin 116, it changes the tension on the cables 134a and 134b running to the pawl assemblies 110a and 110b. When the button 112 is pushed and the tension plate 126 moves inwardly (to the right in FIG. 8), the two cables 134a and 134b are respectively pulled thereby actuating the pawl assemblies 110a and 110b into an open position. Since the primary shaft 118 is fixed to the cross-plate 120, the pawl assemblies 110a and 110b move in and out therewith and can be independently opened via the button 112 and pawl release pin 116.

Figure 9:
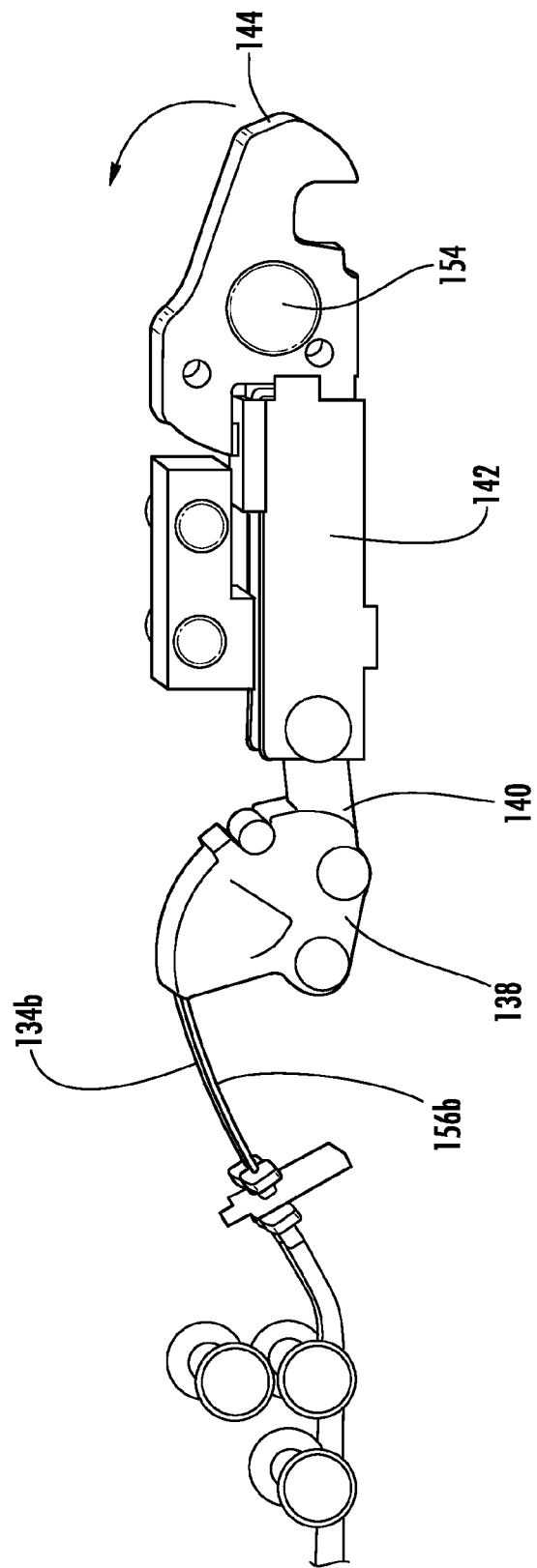
FIG. 9 is a side view of a locking pawl in a lock position.
Figure 10:
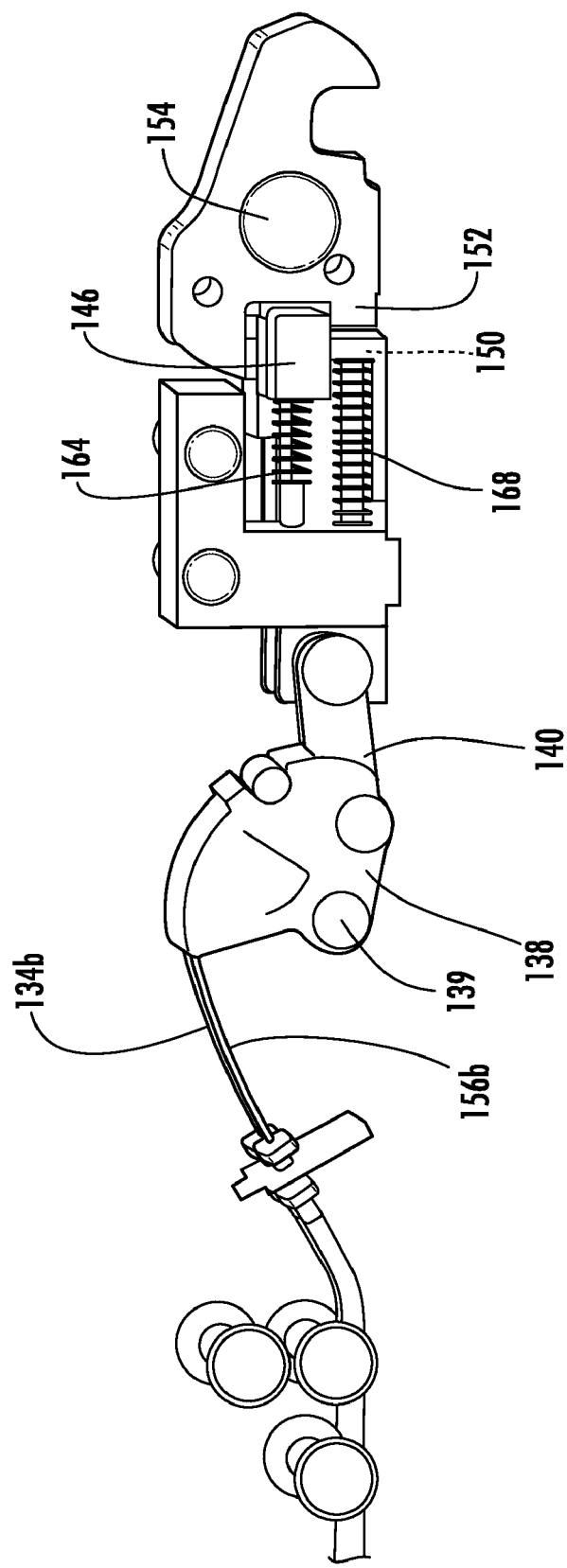
FIG. 10 is a side view of the locking pawl with release plate in shadow for illustration purposes.

FIGS. 9-11 show the preferred operation the opening and locking of the pawl assemblies 110a and 110b. While this construction is preferred, any type of pawl assembly can be used to carry out the present invention. Moreover, alternatives to the cable pulley system may be used and is within the scope of the present invention. FIG. 9 shows the mechanical interior components of one the pawl assemblies 110a and 110b, e.g. 110b, with its outer pawl housing 136 removed for ease of discussion. The left pawl assembly 110a works the same as the right pawl assembly 110b.

The cable 134b pulls a pivoting cam member 138 that is attached to a linear linkage 140, which is in turn attached to an impact plate 142. When the cable 134b is pulled via the movement of the tension plate 126, the pivoting cam member 138 pulls the impact plate 142 to the left about a pivot pin 139. The impact plate 142 is shown in shadow in FIG. 10. For unlocking of the tooth 144 of the pawl assembly 110b, the cable 134b is pulled to move the impact plate 142 to the left to pull the upper spring-biased block 146, by spring 164, also to the left to clear the upper block 146 from within the notch 148 in the pawl tooth 144. With the upper block 146 removed, the bottom spring-biased block 150, by spring 168, pushes on the flange 152 of the pawl tooth 144 to urge it to rotate counter-clockwise about a pin 154. When the pawl assembly 110b is in place over a loop 12 of the LATCH system, the button 112 can be released thereby releasing tension on the pivoting cam 138 member to cause the impact plate 142 to move to the right cause the upper block 146 to reside back in the notch 148 for locking the pawl tooth 144 in place. Commonly owned U.S. Ser. No. 12/565,523, filed Sep. 23, 2009 is incorporated herein by reference, which discloses further details of a construction for a lower anchor coupling.

Figure 12:
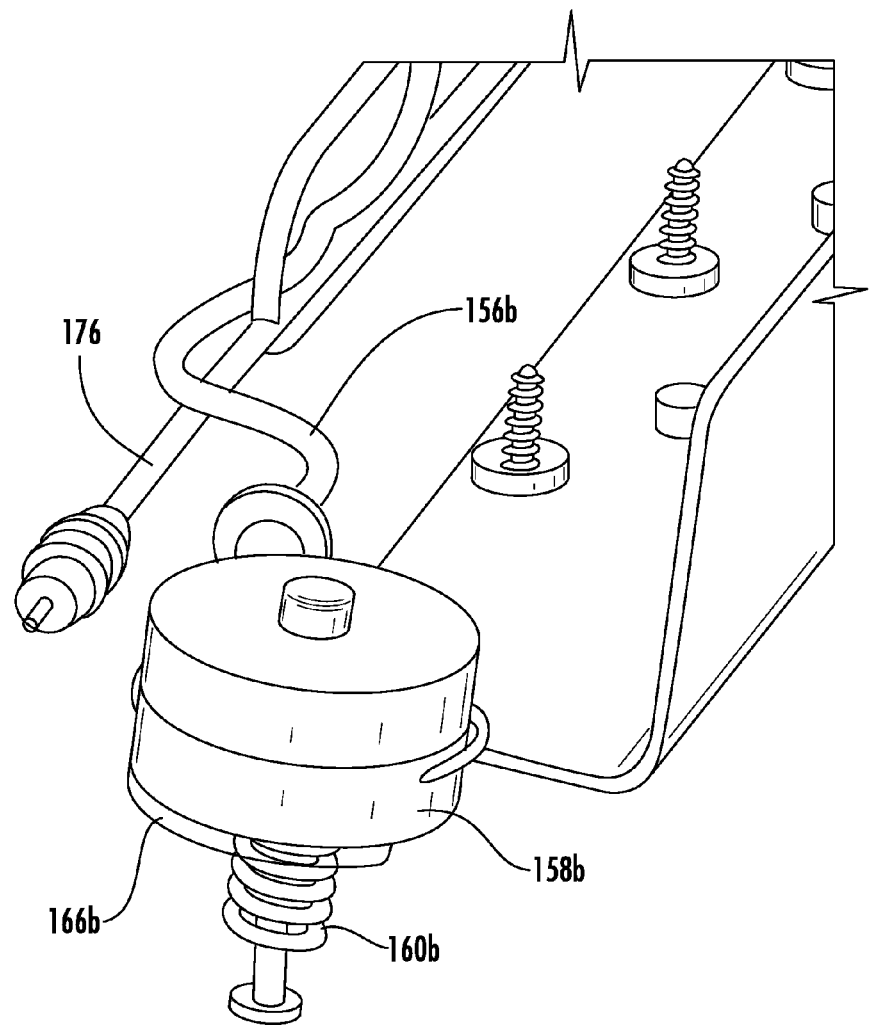
FIG. 12 is a close-up front perspective view of the indicator member.
Figure 13:
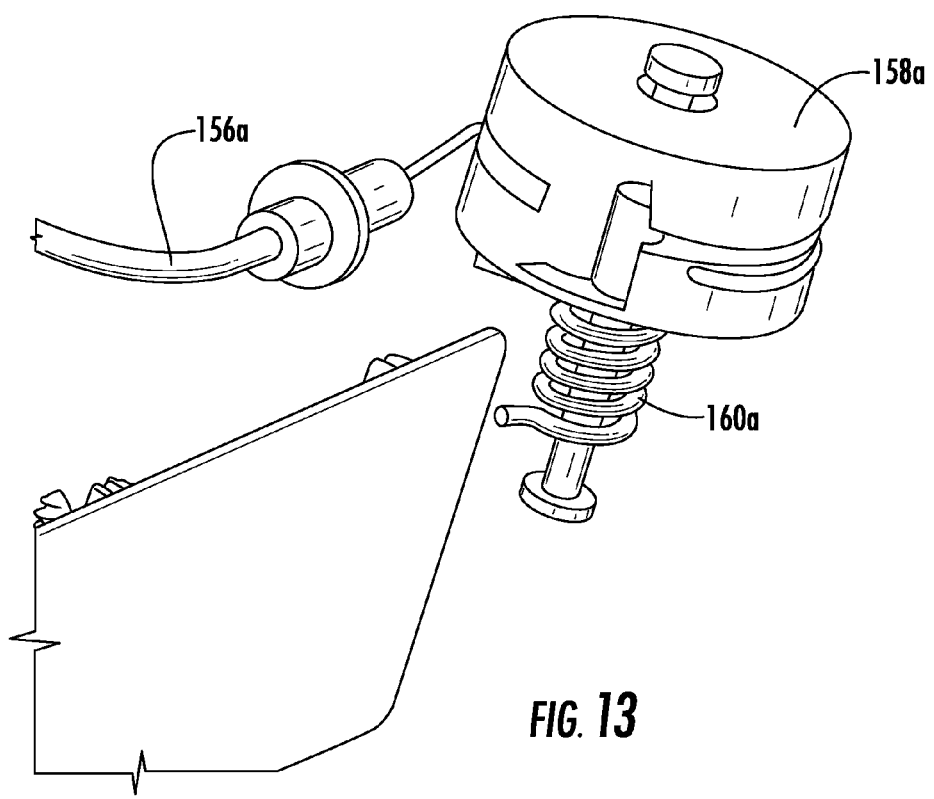
FIG. 13 is a close-up rear perspective view of the indicator member.

The indicator members 130a and 130b are generally shown in FIG. 5A and FIGS. 7 and 8. Further details of the indicator members 130a and 130b is shown in FIGS. 12 and 13. The indicator members 130a and 130b are preferably located at the front of the coupling device 100 so they may be easily seen by the installer. The indicator members 130a and 130b display the current open or locking status of the respective pawl assemblies 110a and 110b. In view of their remote location to the pawl assemblies 110a and 110b, the present invention 100 employs cabling 156a and 156b from the pawl assemblies 110a and 110b to manipulate the indicator members 130a and 130b. As can best be seen in FIG. 8, cabling 156a and 156b is routed from the pivoting cam member 138 to the indicator members 130a and 130b. This cabling 156a and 156b is in addition to the cabling 134a and 134b used for actuation of the pawl assemblies 110a and 110b. Thus, depending on the positioning of the pivoting cam member 138, the indicator cables 156a and 156b will be, in turn, changed as a result.

When at rest, that is, when the pawl assemblies 110a and 110b are in a locked position, the pivoting cam member 138 is rotated clockwise thereby pulling the cable 156b to the right, as viewed in FIG. 8, for indicator 130b. A rear view of left indicator member 130a is shown in FIG. 8, which operates in the same fashion as indicator 130b. The indicator member 130b includes a rotating drum 158b that is connected to the free end of the indicator cable 156b. The drum 158b is rotatingly spring-biased by a spring 160b to pull on the indicator cable 156b. Therefore, when the pawl assembly 110b is moved to an open position, the pawl cable 134b is pulled while simultaneously the tension in the indicator cable 156b is taken up by the forces of the spring-biasing spring 160b connected to the rotating drum 158b of the indicator member 130b to, thereby, pull on the indicator cable 156b. As the drums 160a and 160b of the indictor members 130a and 130b rotate, a different portion of the drums 160a and 160b respectively face forward to the installer. Thus, the portion of the drum 160b, that is facing forward through the window 124b in the housing 108 when the pawl assemblies 110a and 110b are open, are colored green to indicate the open position status of the pawl assemblies 110a and 110b. Drum 160a on the opposite side of the device 100 operates in the same fashion.

On the other hand, when the button 112 is released and the pawl assemblies 110a and 110b go to their locked positions, the pawl cable 134a and 134b is pulled toward the free end of the pawl assemblies 110a and 110b by the springs 164 in the pawl assembly 110a and 110b, namely the upper coil spring 164 via the impact plate 150. In this condition, the indicator cable 156b must also move toward the free ends of the pawl assembly 110b because it is also connected to the pivot cam member 138. In this case, tension on the spring 160b of the indicator member 130b is increased as the drum 158b rotates to permit movement of the indicator cable 156b to the right, as in FIG. 8. In this latter condition, a different portion of the drum 158b will face forward in the locked condition. As above, it is preferred that this portion of the drum 158b of the indicator member 130b be of the color red to indicate a locked position of the corresponding pawl assembly 110b. It should be understood that fascia or covers 166b may be used over the drums 158b of the indicator members 130 to carry the desired colors to provide a solid panel of color for viewing through the windows 124a and 124b in the front of the housing 108.

Figure 14:
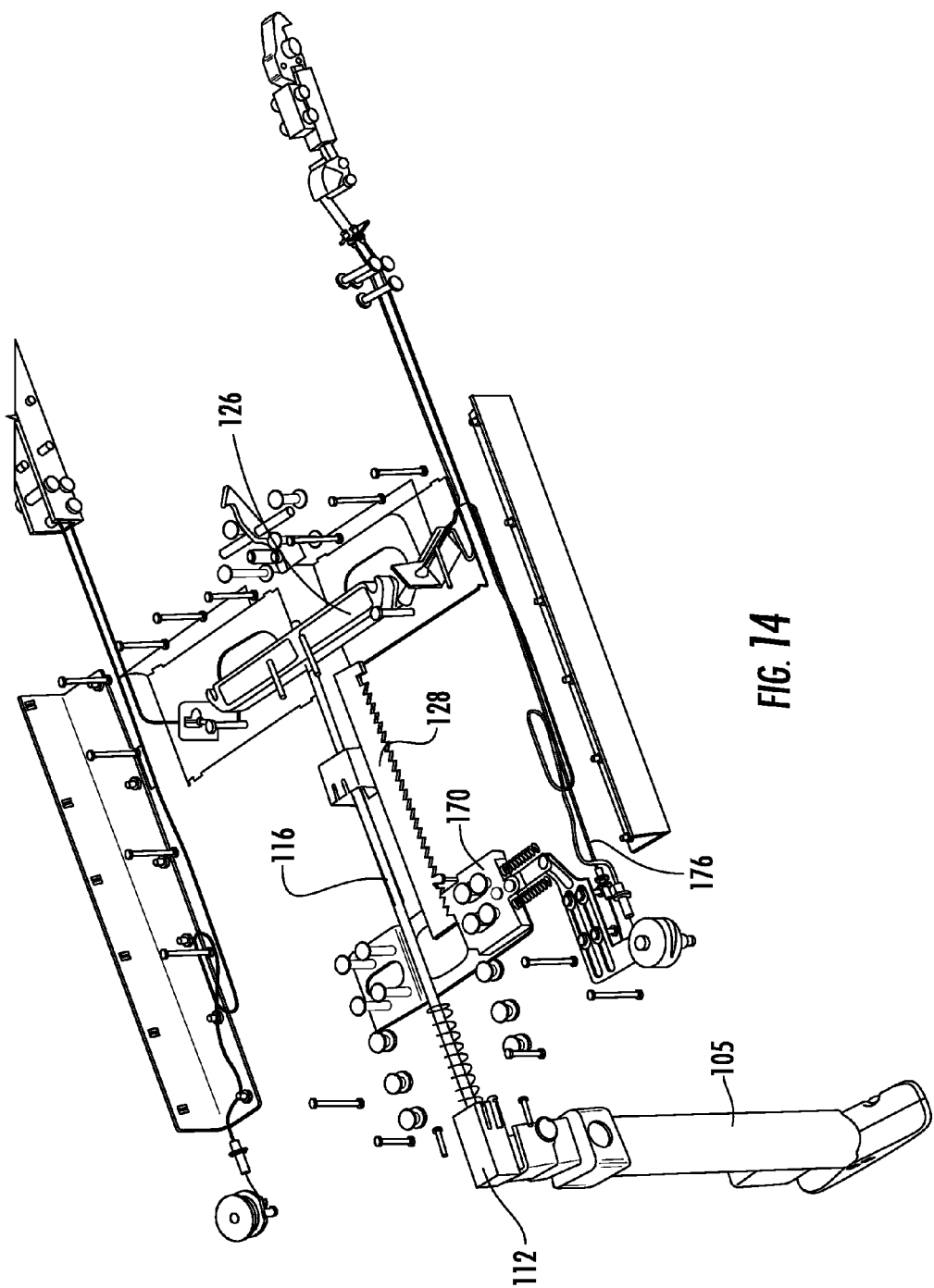
FIG. 14 is a perspective view of the device of the present invention with ratchet housing removed for illustration purposes.
Figure 15:
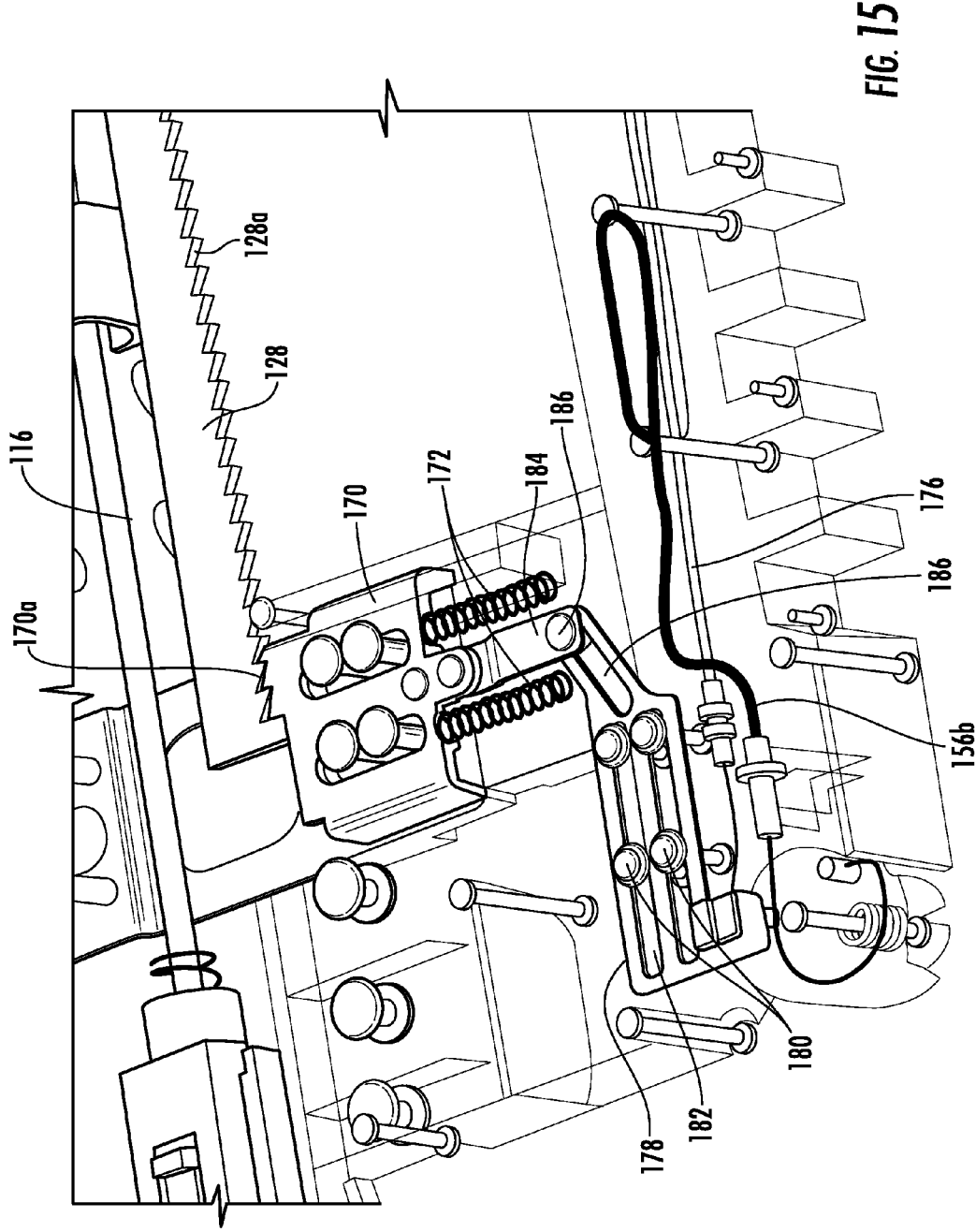
FIG. 15 is a close-up perspective view of the ratchet construction of FIG. 14.

FIGS. 14 and 15 show the ratchet assembly 122 of the coupling device 100 of the present invention. FIG. 14 shows how the ratchet assembly 122 fits within the entire coupling device 100 of the present invention. In general, there is a need to control the in and out actuation of the Y-shaped structure that includes the primary shaft 118, the cross-plate 120 with two pawl assemblies 110a and 110b attached to the free ends thereof. Moreover, there is a need to lock the positioning of the Y-shaped member within the housing 108 to provide a tight and secured fit of the coupling device 100 to a vehicle seat 106. The ratchet assembly 122 includes a toothed ratchet arm 128 that is connected to the cross-plate member 120 and the primary shaft 118 so it travels with these two components.

As best seen in FIG. 15, a complementary toothed plate 170 is releasably engageable along the toothed side of the toothed ratchet arm 128. The toothed plate 170 is spring-biased into communication with the teeth on the ratchet arm 128 via springs 172. The toothed plate 170 is secured to the housing 108 of the coupling device 100. When the toothed plate 170 is engaged with teeth of the ratchet arm 128, the primary shaft 118 will be fixed in place thereby locking actuating movement of the pawl assemblies 110a and 110b. It is desirable to release the toothed plate 170 when the button 112, connected to the pawl release pin 116, is depressed.

To carry this out, a ratchet cable 176 is connected between one of the free ends of the tension plate 126, such as the right free end as in FIG. 14, and a sliding translation plate 178 proximal to the toothed plate 170, which is slidably mounted to the housing 108. When the button 112 is pressed, the tension plate 126 actuates thereby pulling on the ratchet cable 176 in addition to the pawl cables 134a and 134b that are also connected to the free ends of the tension plate 126. Pulling on the ratchet cable 176 pulls on the translation plate 178 against the forces of the springs 172 of the ratchet assembly 122. The translation plate 178 is preferably slidably mounted to a series of posts 180 via a number of slide slots 182. The translation plate 178 is interconnected to the toothed plate 170 via a linkage 184 and slidable communication via a pin 186 on the linkage 184 and a slot 186 on the translation plate 178. As a result, pulling on the ratchet cable 176 by pressing the button 112 translates transverse motion to the toothed plate 170 to lift it off of the toothed ratchet arm 128 to disengage the respective teeth 128a and 170a thereon. In this released condition, the primary shaft 118 and pawl assemblies 110a and 110b connected thereto may freely actuate in and out of the housing 108 for adjustment. When the primary shaft 118 and pawl assemblies 110a and 110b are located where desired, the button 112 is released thereby engaging the toothed plate 170 back into communication with the teeth 128a of the ratchet arm 128.

Figure 17:
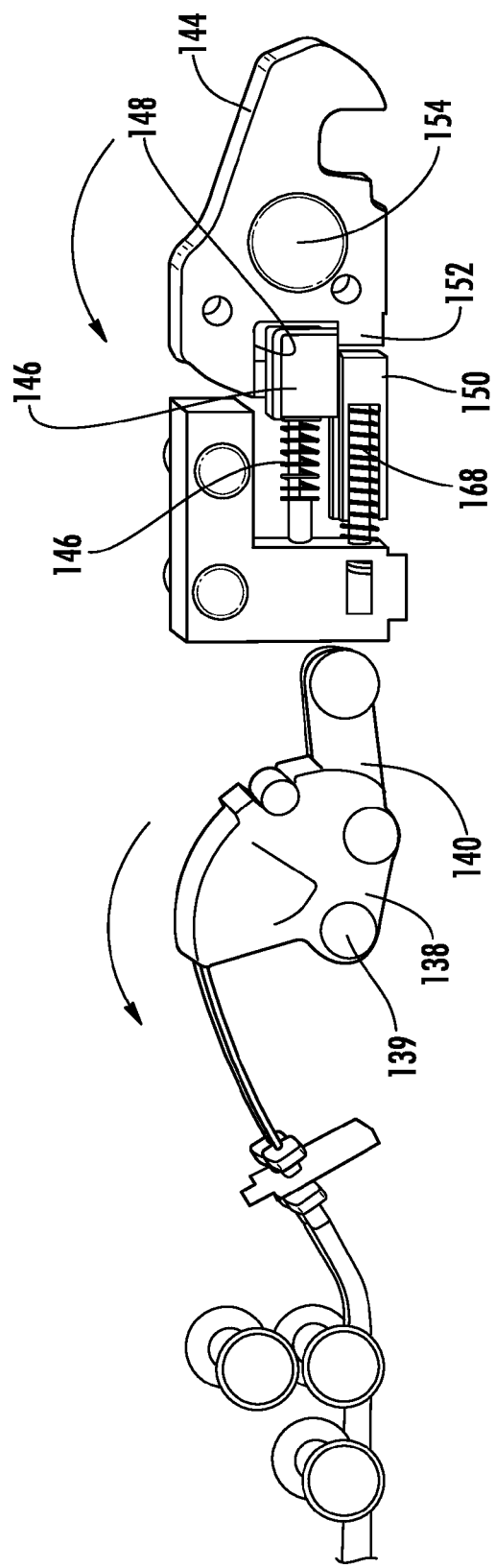
FIG. 17 is a side perspective view of the device with the locking pawls in an extended or "out" position.
Figure 16:
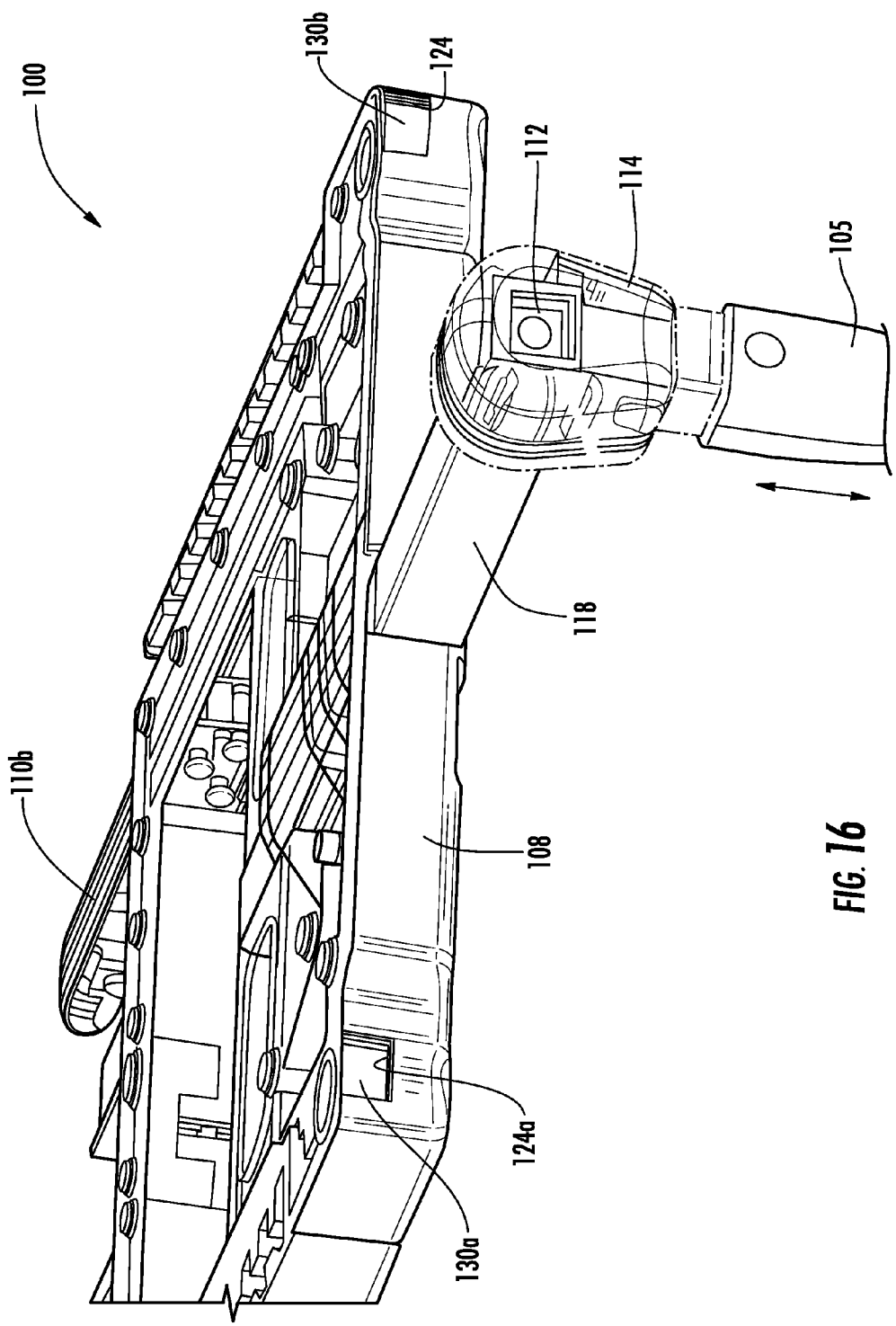
FIG. 16 is a front perspective view of the device showing use of the invention.
Figure 17:
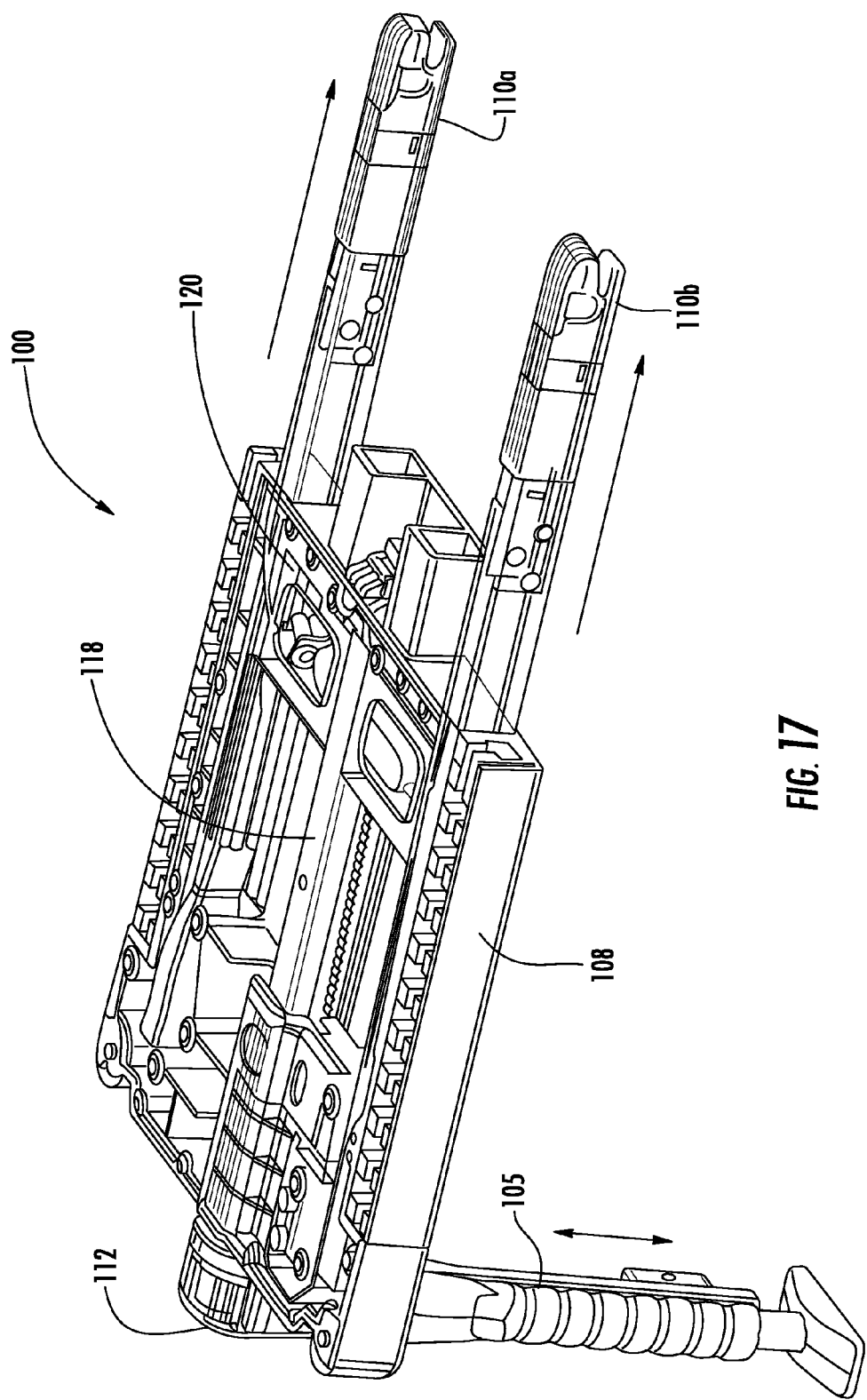
Figure 18:
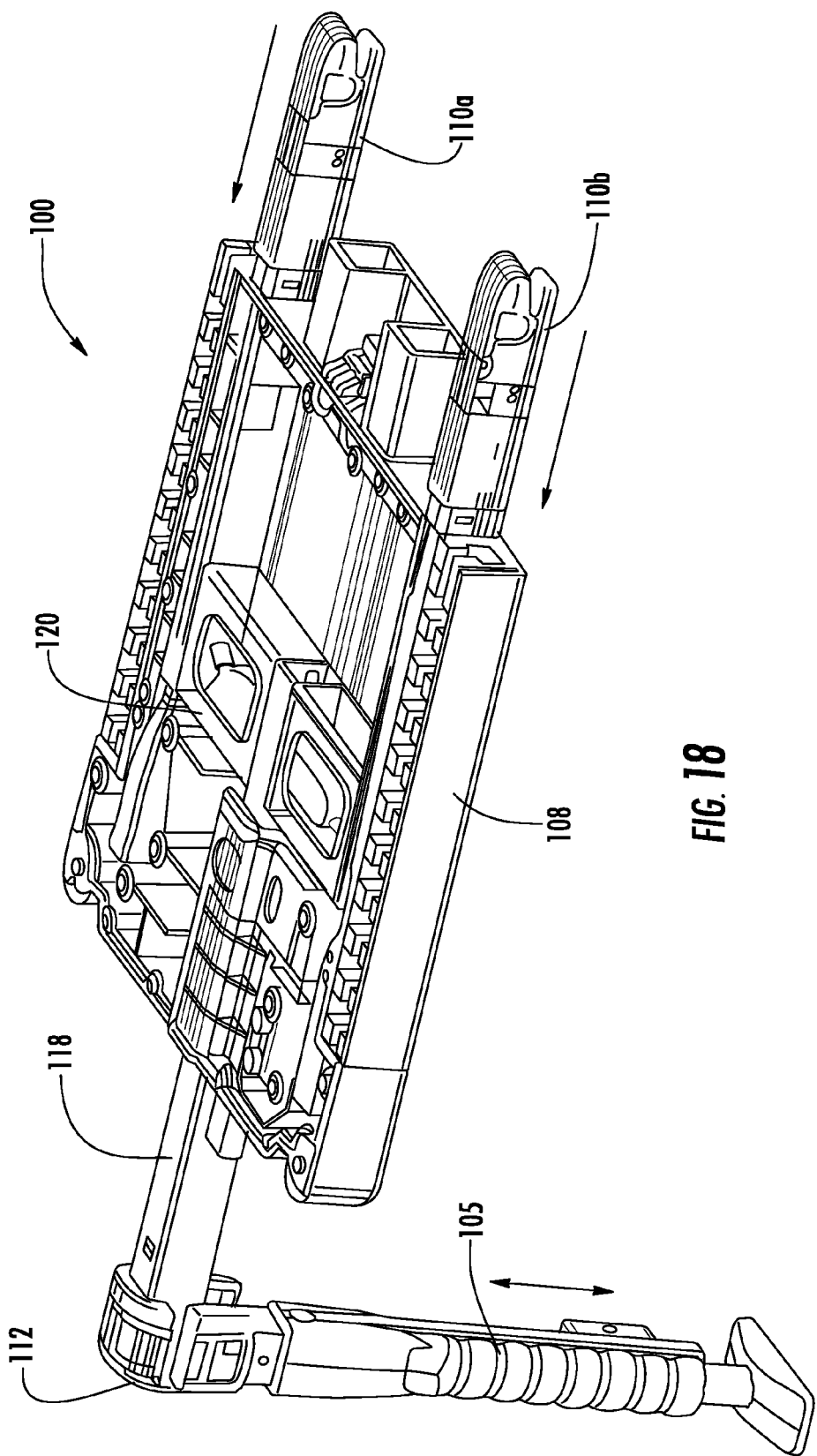
FIG. 18 is a perspective view of the device with the locking pawls in a retracted or "in" position.

FIGS. 16-21 illustrate operation and installation of the present invention. For ease of discussion, the vehicle seat 106, child car seat 102 and the top of housing 108 of the coupling device 100 have been removed. In FIG. 16, it can be seen that the centrally located single button 112 is pressed to operate all functions of the coupling device 100 of the present invention. Pressing this single button 112 unlocks the pawl assemblies 110a and 110b, unlocks the ratchet assembly 122 and also changes the displays of the indicator members 130a and 130b to indicate the color green to show that the pawl assemblies 110a and 110b are in an open condition. FIG. 17 shows the pawl assemblies 110a and 110b in a fully extended position. FIG. 18 shows the pawl assemblies 110a and 110b in a fully retracted position.

Figure 19:
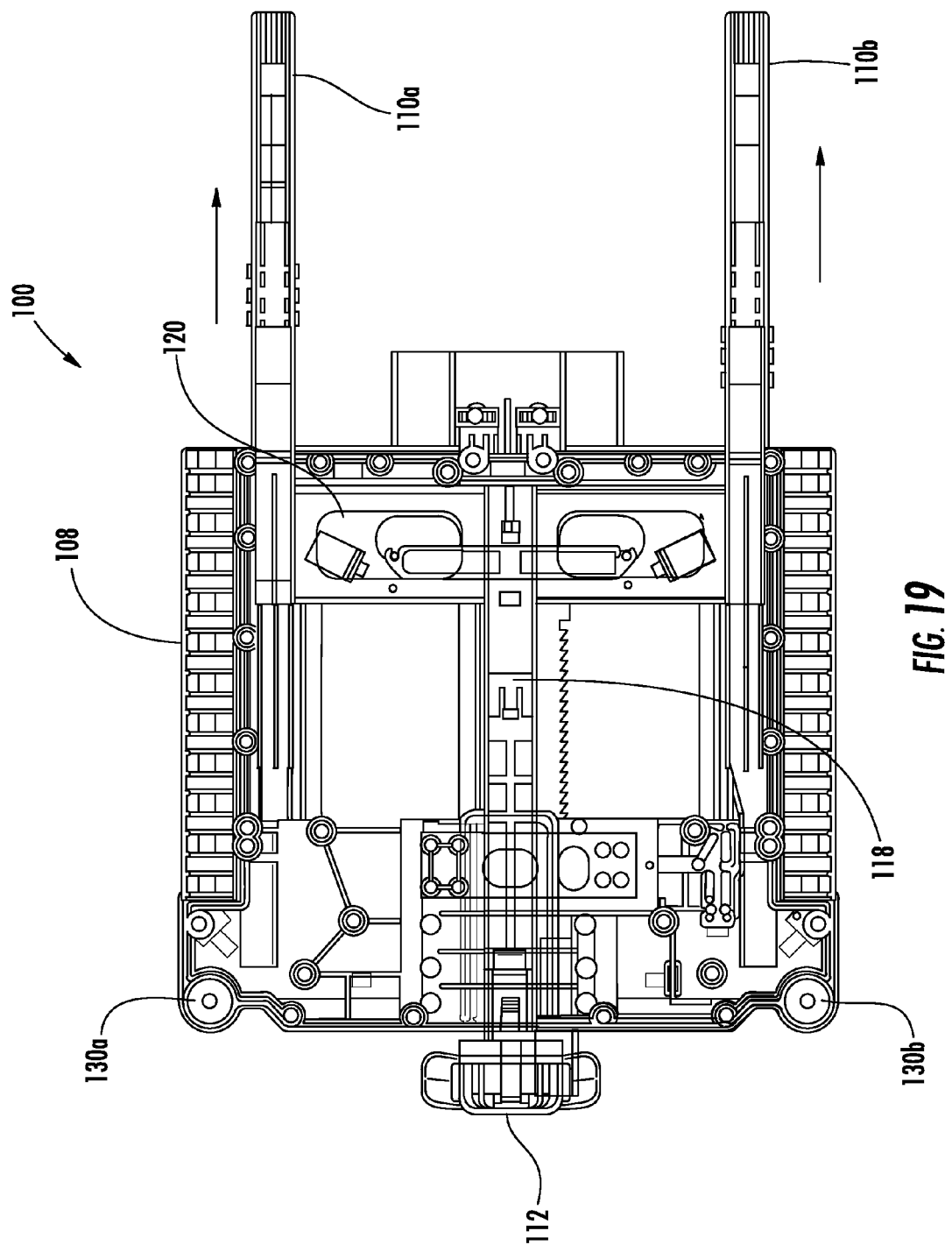
FIG. 19 is a top view of the device with locking pawls in an extended or out position.

For installation, the first step is to place the coupling device 100, with child car seat 102 attached thereto. The height of front edge of the coupling device 100 can be adjusted as needed using a vertical post 105 with footing 109, via adjustment member 107 to accommodate the distance been the top of the vehicle seat 106 and the floor of the vehicle (not shown). The coupling device 100 is placed on the top of the vehicle seat 106 and the button 112 is pressed and the pawl assemblies 110a and 110b are preferably fully extended, as seen in FIG. 19, by pulling on the front of the housing 108 while holding on to the front adjustable post 105. While the button 112 is pressed, with the pawl assemblies 110a and 110b in an open position, they are engaged with the loops 12 of the vehicle seat's LATCH loops. With the button 112 still pressed, the front of the housing 108 and/or child car seat 102 is pushed towards the vehicle seat 106 until the child car seat 102 is snug against the back of the vehicle seat 106 and in the desired position.

Figure 20:
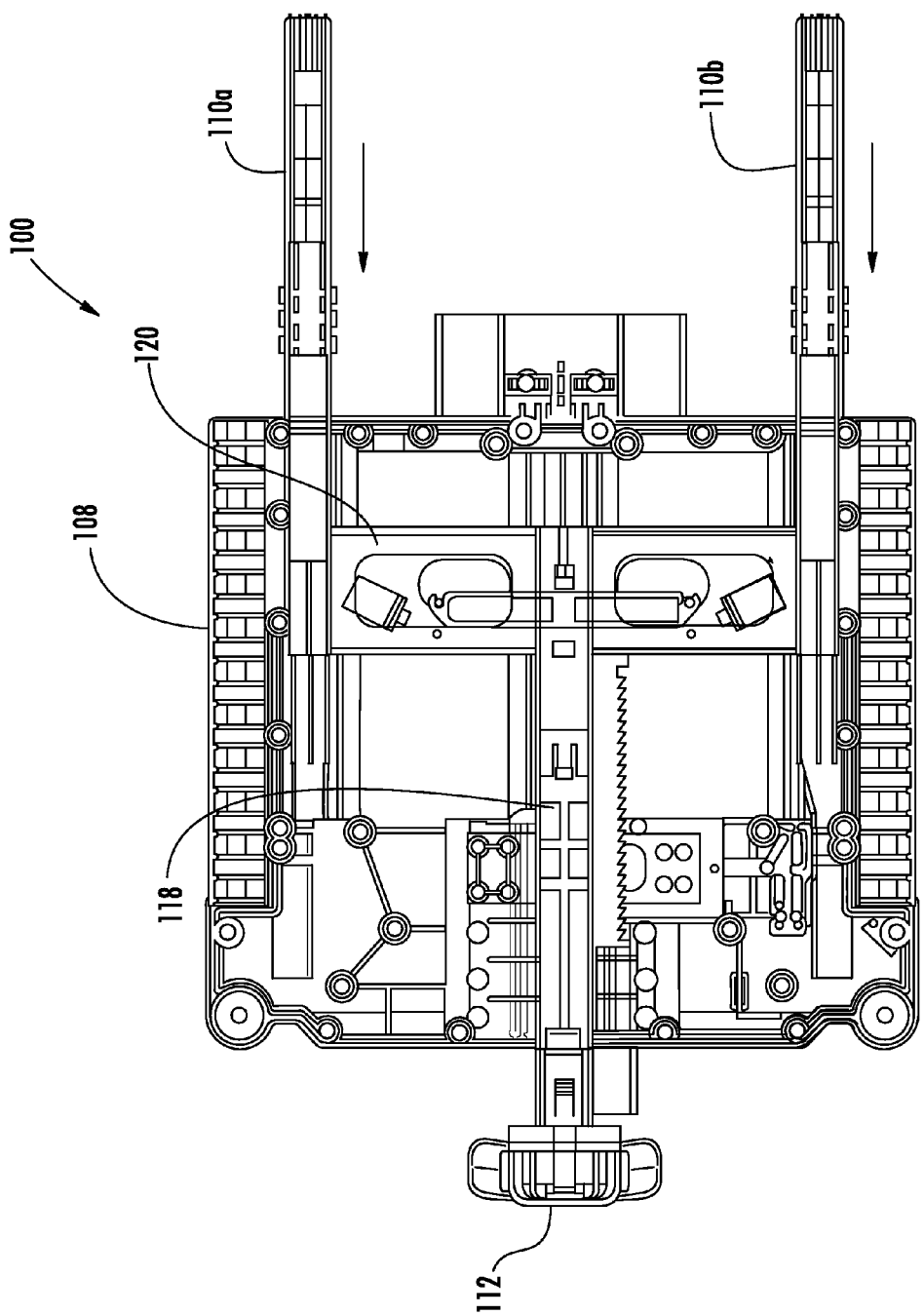
FIG. 20 is a top view of the device with locking pawls in a partially retracted or "middle" position.
Figure 21:
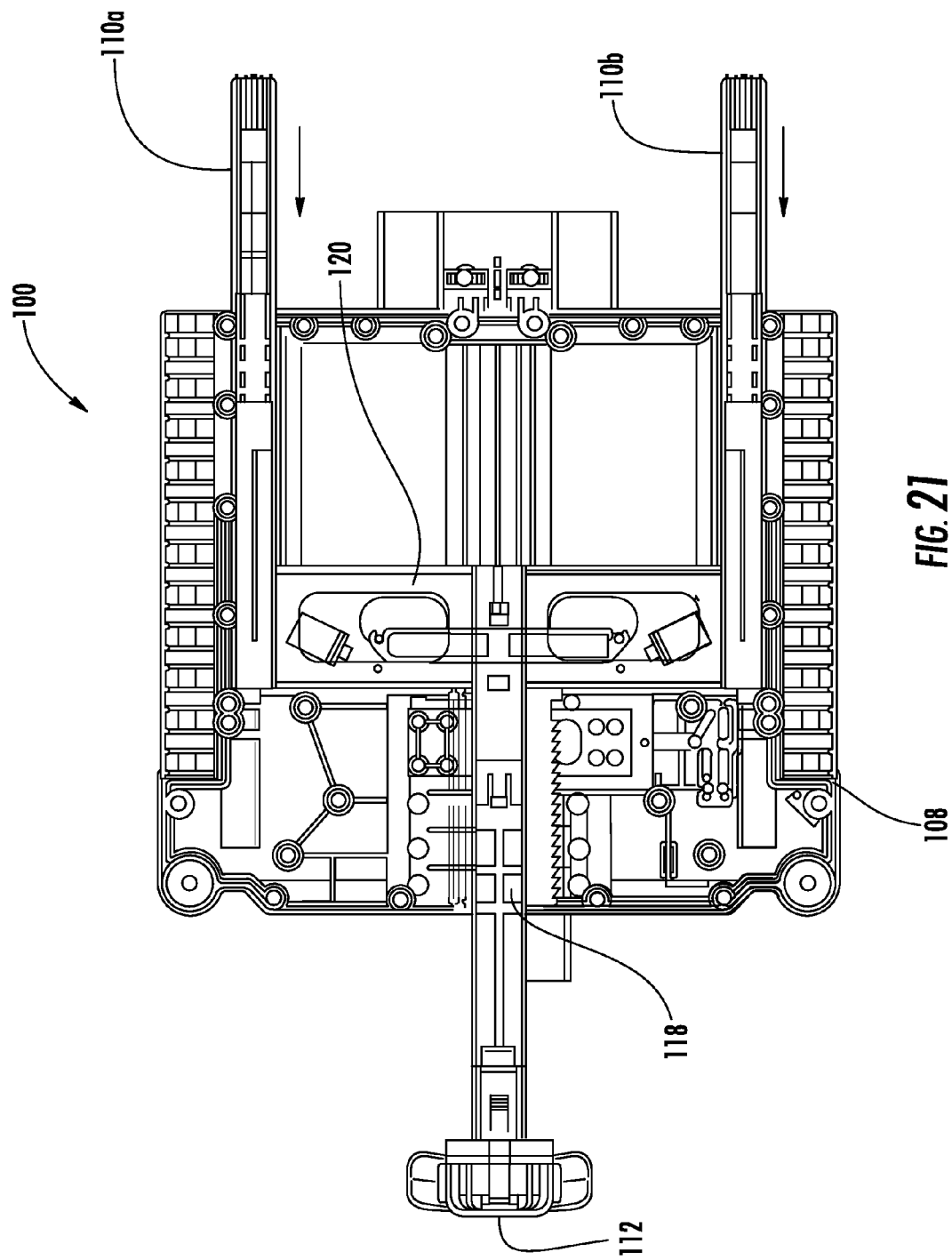
FIG. 21 is a top view of the device with the locking pawls in a retracted or "in" position.

For example, the pawl assemblies 110a and 110b may now be only partially retracted, as in FIG. 20 when the desired location is reached. Or, it is possible, that is needed for the pawl assemblies 110a and 110b to be fully retracted, as in FIG. 21, to reach the desired position.

While still pushing on the front of the housing 108 and/or the child car seat 102, the button 112 is released to close the ratchet assembly 122 to prevent any movement of the child car seat 102 relative to the vehicle seat 106, close and lock the pawl assemblies 110a and 110b while also change the display of the indicator members 130a and 130b to the color red indicating that the pawl assemblies 110a and 110b are in a locked position.

It should also be noted that any of the components of the coupling device 100 of the present invention may be made out of any suitable material, such as plastic and metal. These components may be molded, cast or otherwise formed to achieve the required configuration and shape.

It would be appreciated by those skilled in the art that various changes and modifications can be made to the illustrated embodiments without departing from the spirit of the present invention.

What is claimed is:

1. A device for locking to a vehicle seat having a child car seat mounting system including a first mounting loop and a second mounting loop, comprising:
  a first hook being configured and arranged to releasably connect to a first mounting loop of a child car seat mounting system; the first hook being movable between a lock position and an open position;
  a second hook being configured and arranged to releasably connect to a second mounting loop of a child car seat mounting system; the second hook being movable between a lock position and an open position;
  a button interconnected to both the first hook and the second hook; the button being configured and arranged to simultaneously control movement of the first hook and the second hook between their respective lock and open positions to permit locking engagement of a first mounting loop and a second mounting loop, respectively;
  a housing having a support surface; the first hook and the second hook partially residing in the housing; and
  the support surface being configured and arranged for receipt of a child safety seat thereon.

2. The device of claim 1, further comprising:
  a connector member interconnected between the first hook and the second hook; whereby the first hook and the second hook member move in unison while opening in unison and locking independently.

3. The device of claim 2, further comprising:
  a ratchet interconnected to the connector member and the button; whereby actuation of the button disengages the ratchet and enables free movement of the first hook and the second hook.

4. The device of claim 3, wherein actuation of the button simultaneously opens the first hook, opens the second hook and disengages the ratchet.

5. The device of claim 1, further comprising:
  a first indicator member, having a first display and a second display, interconnected to the first hook; the first display of the first indicator being displayed when the first hook member is in the lock position and the second display of the first indicator being displayed when the first hook member is in the open position;
  a second indicator member, having a first display and a second display, interconnected to the second hook; the first display of the second indicator being displayed when the second hook member is in the lock position and the second display of the second indicator being displayed when the second hook member is in the open position.

6. The device of claim 5, wherein actuation of the button simultaneously opens the first hook, opens the second hook, displays the second display on the first indicator member if the first hook is successfully moved to the open position, and displays the second display on the second indicator if the second hook is successfully moved to the open position.

7. The device of claim 1, wherein the button is interconnected to the first hook and the second hook via cables.

8. The device of claim 1, wherein the first hook is a pivoting pawl and the second hook is a pivoting pawl.

9. A device for locking to a vehicle seat having a child car seat mounting system including a first mounting loop and a second mounting loop, comprising:
  a first hook being configured and arranged to releasably connect to a first loop of a child car seat mounting system; the first hook being movable between a lock position and an open position;
  a first indicator member configured to indicate the position of the first hook;
  a second hook being configured and arranged to releasably connect to a second loop of a child car seat mounting system; the second hook being movable between a lock position and an open position; the first hook and the second hook being interconnected together to move in unison while opening in unison and locking independently;
  a second indicator member configured to indicate the position of the second hook;
  a button interconnected to both the first hook and the second hook; the button being configured and arranged to simultaneously control movement of the first hook and the second hook between their respective lock and open positions to permit locking engagement of a first mounting loop and a second mounting loop, respectively;
  a ratchet interconnected to the connector member and the button; whereby actuation of the button disengages the ratchet and enables free movement of the first hook and the second hook;
  whereby actuation of the button simultaneously opens the first hook, opens the second hook, disengages the ratchet and displays on the first indicator member and the second indicator member the respective positions of the first hook and the second hook.

* * * * *